(12) United States Patent
Divincenzo

(10) Patent No.: US 6,382,490 B1
(45) Date of Patent: May 7, 2002

(54) FISHING TACKLE BOX WORN ABOUT A WAIST

(76) Inventor: Michael Divincenzo, 59 Adams Ave., Berlin, NJ (US) 08009

( * ) Notice: Subject to any disclaimer, the term of this patent is extended or adjusted under 35 U.S.C. 154(b) by 0 days.

(21) Appl. No.: 09/780,161

(22) Filed: Feb. 9, 2001

(51) Int. Cl.$^7$ .................................................. A45C 1/04
(52) U.S. Cl. ................... 224/681; 224/148.6; 224/576; 224/680; 224/683; 224/920; 224/43; 224/54.1; 224/206; 224/315.11
(58) Field of Search ........................... 224/148.5, 148.6, 224/240, 251, 576, 660, 680, 681, 682, 683, 920; 43/54.1; 206/315.11

(56) References Cited

U.S. PATENT DOCUMENTS

| | | | | |
|---|---|---|---|---|
| 3,277,599 A | * | 10/1966 | Griffeth | 224/199 |
| 3,317,097 A | * | 5/1967 | Giordano | 206/315.11 |
| 3,638,843 A | * | 2/1972 | Ortynski | 206/315.11 |
| 4,323,181 A | * | 4/1982 | Spasoff | 224/674 |
| 5,044,537 A | * | 9/1991 | Bufalo | 220/4.27 |
| 5,240,156 A | * | 8/1993 | Sicotte et al. | 224/148.5 |
| 5,397,040 A | * | 3/1995 | Lee | 206/315.11 |
| 5,505,354 A | * | 4/1996 | Hutton et al. | 206/315.11 |
| 5,535,882 A | * | 7/1996 | Liu | 206/376 |
| 5,570,824 A | * | 11/1996 | Lyon et al. | 224/148.5 |
| 5,619,819 A | * | 4/1997 | Hauschild | 224/586 |
| 5,829,653 A | * | 11/1998 | Kaiser | 2/2.5 |
| 5,950,352 A | * | 9/1999 | Volmer | 206/315.11 |

* cited by examiner

Primary Examiner—Stephen K. Cronin
(74) Attorney, Agent, or Firm—Goldstein Law Offices, P.C.

(57) ABSTRACT

A fishing tackle box worn about a waist including a tackle box portion having a front face, a back face, a top face, a bottom face, and opposed side faces. The front face is defined by a plurality of compartments being slidably disposed therein. The front face has a cover panel hingedly coupled thereto. The cover panel is openable to a position essentially perpendicular to the front face. The opposed side faces each have a belt strap extending outwardly therefrom. The belt straps each have corresponding male and female buckles for securing the tackle box portion around a waist of a user.

7 Claims, 2 Drawing Sheets

FISHING TACKLE BOX WORN ABOUT A WAIST

BACKGROUND OF THE INVENTION

The present invention relates to a fishing tackle box worn about a waist and more particularly pertains to holding all items needed for fishing that can be carried about the waist for easy access.

Fishing is an activity that requires a person to have many accessories with them to enjoy their fishing experience. Many fishing accessories are held in a tackle box that a person fishing will keep at their side to reach. Other items a person fishing uses will be kept nearby, requiring the person fishing to look for when needed. This will often require the person fishing to put his fishing pole down at a time when a fish might be catchable. What is needed is a device that will allow a person fishing to hold these items and attach to his body for easy access so that the fishing pole does not have to be abandoned anytime during the fishing experience.

The present invention attempts to solve the abovementioned problem by providing a waist-mountable tackle box that also includes a first aid kit, a water bottle, and all-in-one tool, to facilitate the fishing experience.

The use of fishing devices and accessories is known in the prior art. More specifically, fishing devices and accessories heretofore devised and utilized for facilitating fishing are known to consist basically of familiar, expected and obvious structural configurations, notwithstanding the myriad of designs encompassed by the crowded prior art that have been developed for the fulfillment of countless objectives and requirements.

By way of example, U.S. Pat. No. 5,397,040 to Lee discloses a waist worn fishing tackle carrier comprising a flexible pack with a variety of different sized individual storage compartments. U.S. Pat. No. 4,323,181 to Spasoff discloses a belt mounted fishing tackle holder comprising a fishing rod holding compartment. U.S. Pat. No. 4,957,231 to Kalisher discloses a tackle box belt device comprising a plurality of pockets for holding fishing accessories.

While these devices fulfill their respective, particular objective and requirements, the aforementioned patents do not describe a fishing tackle box worn about a waist for holding all items needed for fishing that can be carried about the waist for easy access.

In this respect, the fishing tackle box worn about a waist according to the present invention substantially departs from the conventional concepts and designs of the prior art, and in doing so provides an apparatus primarily developed for the purpose of holding all items needed for fishing that can be carried about the waist for easy access.

Therefore, it can be appreciated that there exists a continuing need for a new and improved fishing tackle box worn about a waist that can be used for holding all items needed for fishing that can be carried about the waist for easy access. In this regard, the present invention substantially fulfills this need.

SUMMARY OF THE INVENTION

In the view of the foregoing disadvantages inherent in the known types of fishing devices and accessories now present in the prior art, the present invention provides an improved fishing tackle box worn about a waist. As such, the general purpose of the present invention, which will be described subsequently in greater detail, is to provide a new and improved fishing tackle box worn about a waist that has all the advantages of the prior art and none of the disadvantages.

To attain this, the present invention essentially comprises a tackle box portion having a generally rectangular configuration. The tackle box portion has a front face, a back face, a top face, a bottom face, and opposed side faces. The front face is defined by a plurality of compartments being slidably disposed therein. The front face has a cover panel hingedly coupled thereto. The cover panel is openable to a position essentially perpendicular to the front face. The opposed side faces each have a belt strap extending outwardly therefrom. The belt straps each have corresponding male and female buckles for securing the tackle box portion around a waist of a user. A water bottle is removably coupled with one of the belt straps of the tackle box portion. A storage pouch is disposed within the cover panel of the tackle box portion. The storage pouch contains a first aid kit therein. A tool portion is removably coupled with one of the belt straps of the tackle box portion. The tool portion comprises a handle portion. The handle portion includes a plurality of instruments that can be extended outwardly therefrom. The plurality of instruments includes pliers, a utility knife, a hook file, scissors, a pair of screwdrivers, a bottle opener, a tape measure, a lanyard, and a fish scale.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing tackle box worn about a waist that has all the advantages of the prior art fishing devices and accessories and none of the disadvantages.

It is another object of the present invention to provide a new and improved fishing tackle box worn about a waist that may be easily and efficiently manufactured and marketed.

It is a further object of the present invention to provide a new and improved fishing tackle box worn about a waist that is of durable and reliable construction.

An even further object of the present invention is to provide a new and improved fishing tackle box worn about a waist that is susceptible of a low cost of manufacture with regard to both materials and labor, and which accordingly is then susceptible of low prices of sale to the consuming public, thereby making such a fishing tackle box worn about a waist economically available to the buying public.

Even still another object of the present invention is to provide a new and improved fishing tackle box worn about a waist for holding all items needed for fishing that can be carried about the waist for easy access.

Lastly, it is an object of the present invention to provide a new and improved fishing tackle box worn about a waist including a tackle box portion having a front face, a back face, a top face, a bottom face, and opposed side faces. The front face is defined by a plurality of compartments being slidably disposes therein. The front face has a cover panel hingedly coupled thereto. The cover panel is openable to a position essentially perpendicular to the front face. The opposed side faces each have a belt strap extending outwardly therefrom. The belt straps each have corresponding male and female buckles for securing the tackle box portion around a waist of a user.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
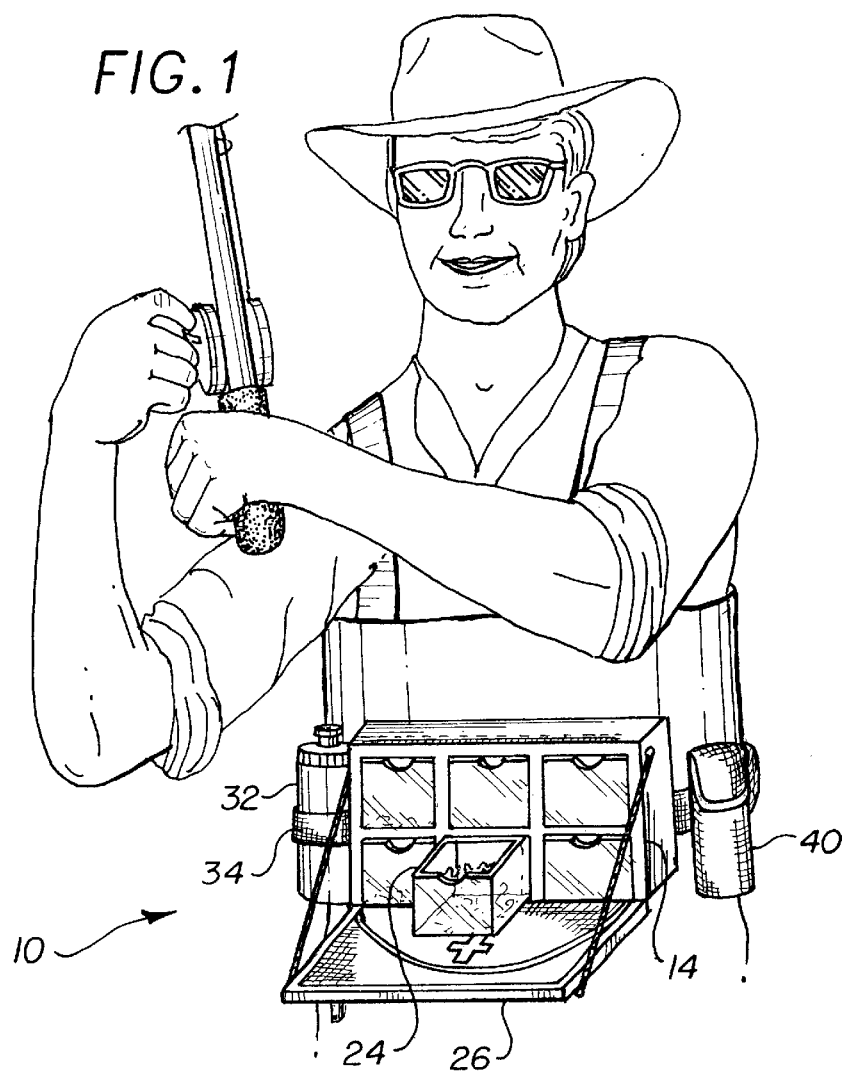
FIG. 1 is a perspective view of the preferred embodiment of the fishing tackle box worn about a waist constructed in accordance with the principles of the present invention.
Figure 2:
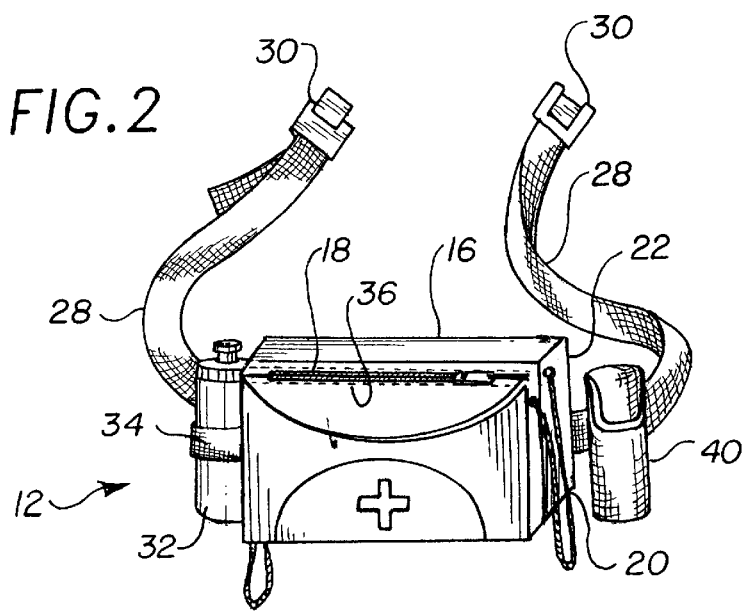
FIG. 2 is a front view of the tackle box of the present invention.
Figure 3:
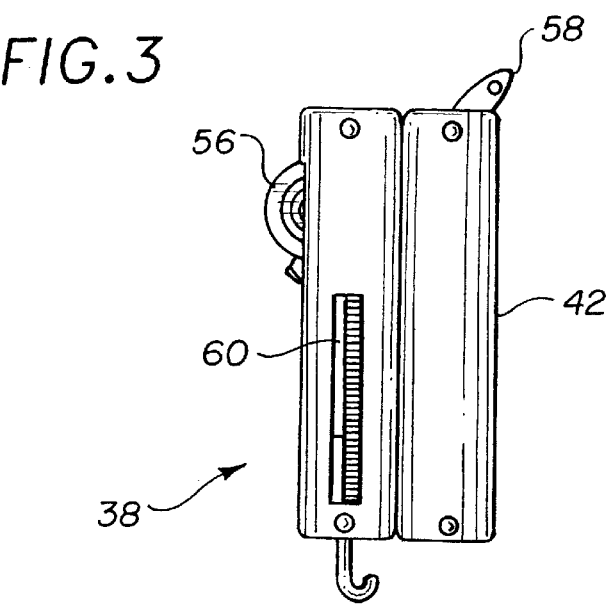
FIG. 3 is a front view of the tool portion of the present invention illustrated in a closed orientation.
Figure 4:
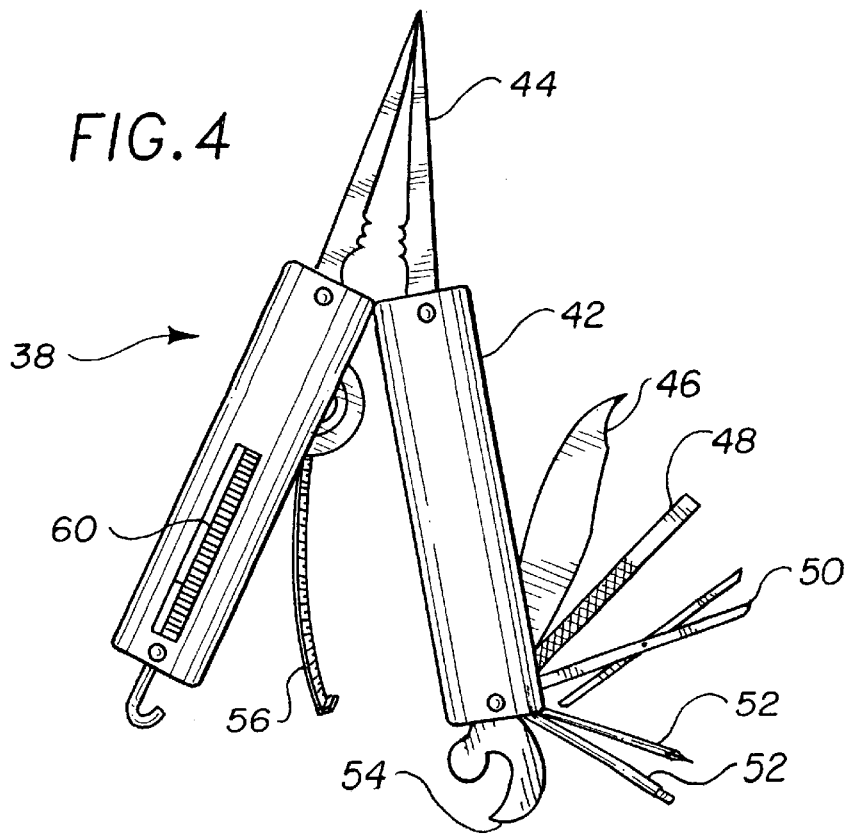
FIG. 4 is a front view of the tool portion illustrated in an open orientation.

With reference now to the drawings, and in particular, to figures one through four thereof, the preferred embodiment of the new and improved fishing tackle box worn about a waist embodying the principles and concepts of the present invention and generally designated by the reference number 10 will be described.

Specifically, it will be noted in the various figures that the device relates to a fishing tackle box worn about a waist for holding all items needed for fishing that can be carried about the waist for easy access. In its broadest context, the device consists of a tackle box portion, a water bottle, a storage pouch, and a tool portion. Such components are individually configured and correlated with respect to each other so as to attain the desired objective.

The tackle box portion 12 has a generally rectangular configuration. The tackle box portion 12 has a front face 14, a back face 16, a top face 18, a bottom face 20, and opposed side faces 22. The front face 14 is defined by a plurality of compartments 24 being slidably disposed therein. The plurality of compartments 24 serve to contain fishing related items therein. Such items includes, but are not limited to, lures, hooks, and fishing line. The front face 14 has a cover panel 26 hingedly coupled thereto. The cover panel 26 is openable to a position essentially perpendicular to the front face 14. When the cover panel 26 is opened, it serves as a small tabletop on which items can be positioned. The opposed side faces 22 each have a belt strap 28 extending outwardly therefrom. The belt straps 28 each have corresponding male and female buckles 30 for securing the tackle box portion 12 around a waist of a user. Note figures one and two.

The water bottle 32 is removably coupled with one of the belt straps 28 of the tackle box portion 12. The water bottle 32 is attached to the belt strap 28 by a circular loop 34 that receives the water bottle 32 therein.

The storage pouch 36 is disposed within the cover panel 26 of the tackle box portion 12. The storage pouch 36 contains a first aid kit (not illustrated) therein. The storage pouch 36 includes a zippered closure or other type of closure means to contain the first aid kit therein.

The tool portion 38 is removably coupled with one of the belt straps 28 of the tackle box portion 12. The tool portion 38 is removably contained within a storage pouch 40 that is secured to the belt strap 28. The tool portion 38 comprises a handle portion 42. The handle portion 42 includes a plurality of instruments that can be extended outwardly therefrom. The plurality of instruments includes pliers 44, a utility knife 46, a hook file 48, scissors 50, a pair of screwdrivers 52, a bottle opener 54, a tape measure 56, a lanyard 58, and a fish scale 60.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A fishing tackle box worn about a waist for holding all items needed for fishing that can be carried about the waist for easy access comprising, in combination:

a tackle box portion having a front face, a back face, a top face, a bottom face, and opposed side faces, the front face being defined by a plurality of compartments being slidably disposed therein, the front face having a cover panel hingedly coupled thereto, the cover panel being openable to a position essentially perpendicular to the front face, the opposed side faces each having a belt strap extending outwardly therefrom, the belt straps each having corresponding male and female buckles for securing the tackle box portion around a waist of a user.

2. The fishing tackle box worn about a waist as set forth in claim 1, and further including a water bottle removably coupled with one of the belt straps of the tackle box portion.

3. The fishing tackle box worn about a waist as set forth in claim 1, and further including a storage pouch disposed within the cover panel of the tackle box portion.

4. The fishing tackle box worn about a waist as set forth in claim 3, wherein the storage pouch contains a first aid kit therein.

5. The fishing tackle box worn about a waist as set forth in claim 1, and further including a tool portion removably coupled with one of the belt straps of the tackle portion, the tool portion being comprised of a handle portion, the handle portion including a plurality of instruments being extendable outwardly thereof.

6. The fishing tackle box worn about a waist as set forth in claim 5, wherein the plurality of instruments include pliers, a utility knife, a hook file, scissors, a pair of screwdrivers, a bottle opener, a tape measure, a lanyard, a fish scale.

7. A fishing tackle box worn about a waist for holding all items needed for fishing that can be carried about the waist for easy access comprising, in combination:

- a tackle box portion having a generally rectangular configuration, the tackle box portion having a front face, a back face, a top face, a bottom face, and opposed side faces, the front face being defined by a plurality of compartments being slidably disposed therein, the front face having a cover panel hingedly coupled thereto, the cover panel being openable to a position essentially perpendicular to the front face, the opposed side faces each having a belt strap extending outwardly therefrom, the belt straps each having corresponding male and female buckles for securing the tackle box portion around a waist of a user;
- a water bottle removably coupled with one of the belt straps of the tackle box portion;
- a storage pouch disposed within the cover panel of the tackle box portion, the storage pouch containing a first aid kit therein; and
- a tool portion removably coupled with one of the belt straps of the tackle portion, the tool portion being comprised of a handle portion, the handle portion including a plurality of instruments being extendable outwardly thereof, the plurality of instruments including pliers, a utility knife, a hook file, scissors, a pair of screwdrivers, a bottle opener, a tape measure, a lanyard, a fish scale.

* * * * *